United States Patent [19]

Varady

[11] 4,167,492
[45] Sep. 11, 1979

[54] SPENT-CATALYST COMBUSTION REGENERATION PROCESS WITH RECYCLE OF HOT REGENERATED CATALYST AND SPENT CATALYST

[75] Inventor: Victor A. Varady, Bartlett, Ill.
[73] Assignee: UOP Inc., Des Plaines, Ill.
[21] Appl. No.: 846,084
[22] Filed: Oct. 27, 1977

Related U.S. Application Data

[60] Continuation-in-part of Ser. No. 731,489, Oct. 12, 1976, abandoned, which is a division of Ser. No. 691,049, May 27, 1976, abandoned.

[51] Int. Cl.² .................. B01J 21/20; B01J 29/38; C10G 11/04; C10G 11/18
[52] U.S. Cl. .................. 252/417; 208/113; 208/120; 208/164; 252/419; 422/223
[58] Field of Search .............. 252/417, 419; 208/113, 208/120, 164; 23/288 B

[56] References Cited

U.S. PATENT DOCUMENTS

| | | | |
|---|---|---|---|
| 2,487,132 | 11/1949 | Hemminger | 252/417 |
| 2,526,881 | 10/1950 | Kunreuther et al. | 252/417 |
| 3,821,103 | 6/1974 | Owen et al. | 252/417 |
| 3,847,793 | 11/1974 | Schwartz et al. | 208/164 |
| 3,893,812 | 7/1975 | Zommer et al. | 23/288 B |
| 4,035,284 | 7/1977 | Gross et al. | 252/417 |
| 4,065,265 | 12/1977 | Pulak | 252/417 |

FOREIGN PATENT DOCUMENTS

2526839 8/1976 Fed. Rep. of Germany ........... 252/417

Primary Examiner—Winston A. Douglas
Assistant Examiner—P. E. Konopka
Attorney, Agent, or Firm—James R. Hoatson, Jr.; Richard D. Stone; William H. Page, II

[57] ABSTRACT

A catalyst regeneration process and apparatus for the oxidation of coke from a spent catalyst and for the conversion of CO resulting from the oxidation of coke to $CO_2$.

Novel feature of the process is the combination of a vertical heat exchange zone and horizontal mixing zone in which a portion of regenerated catalyst produced in a coke oxidation zone and heated to a higher temperature in a CO-conversion zone and spent catalyst are heat exchanged and fresh regeneration gas is then added, to increase the temperature within the coke oxidation zone and to disperse the portion of hot regenerated catalyst, spent catalyst and fresh regeneration gas more evenly into and within that zone thereby increasing the rate, extent and evenness of coke and CO oxidation. The regeneration apparatus includes components by which this can be accomplished.

4 Claims, 1 Drawing Figure

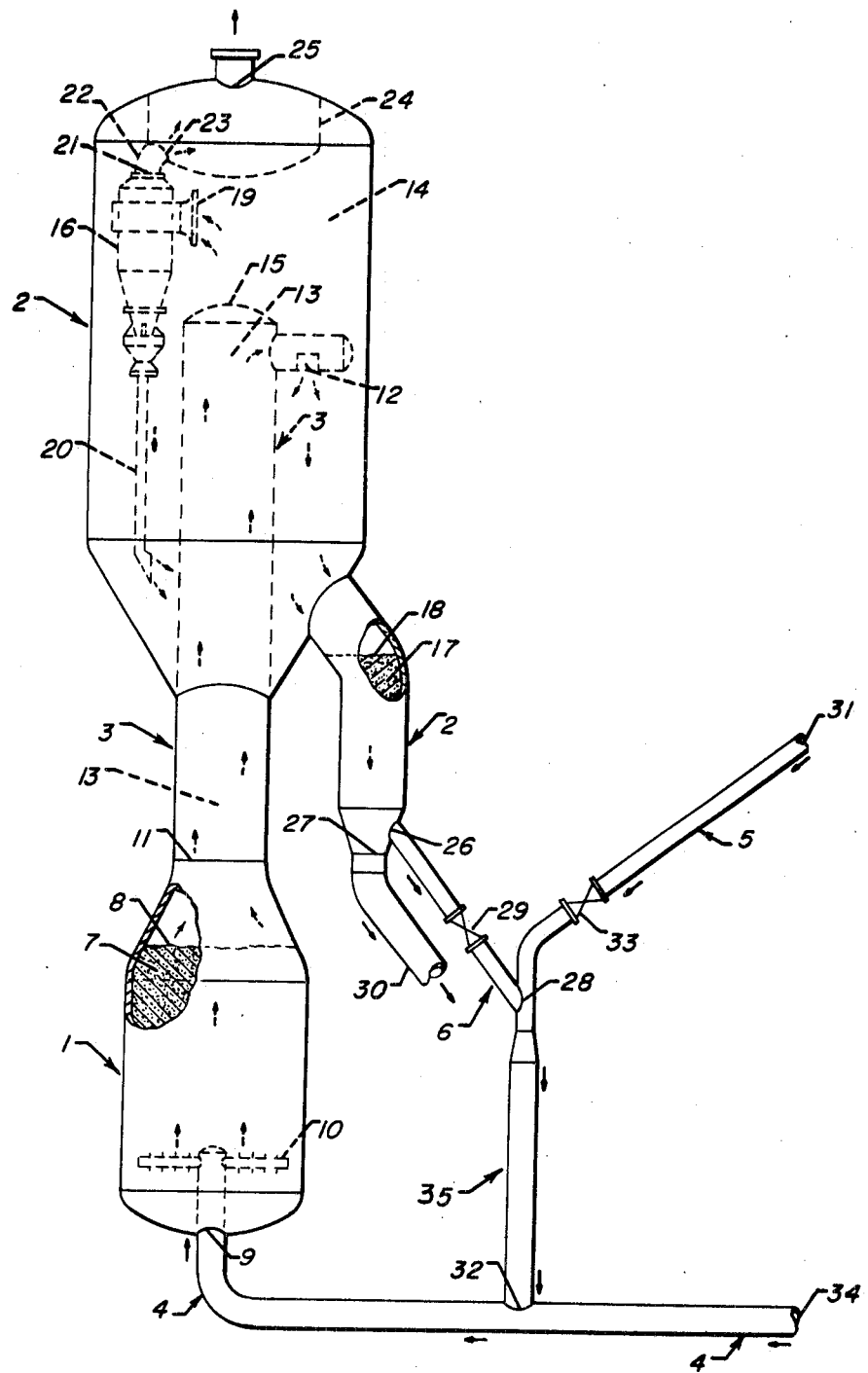

SPENT-CATALYST COMBUSTION REGENERATION PROCESS WITH RECYCLE OF HOT REGENERATED CATALYST AND SPENT CATALYST

CROSS REFERENCE TO RELATED APPLICATIONS

This application is a Continuation-in-Part of my prior copending application Ser. No. 731,489 filed Oct. 12, 1976, now abandoned, which is a Division of my prior application Ser. No. 691,049 filed May 27, 1976, and now abandoned, the teachings of both of which applications are incorporated herein by reference.

BACKGROUND OF THE INVENTION

1. Field of the Invention

The field of art to which this invention pertains is catalyst regeneration. More specifically, the present invention relates to a regeneration process for regenerating spent fluidizable catalytic cracking catalyst and a regeneration apparatus for use in the practice of the process.

2. Description of the Prior Art

In most regeneration processes presently employed the oxidation of coke from spent catalyst is done in a single-vessel regeneration zone containing one or more dense beds located in the bottom of the zone with a large dilute-phase disengaging space positioned above and in connection with the dense bed. In this type of regeneration process the dense bed is maintained in the bottom portion of the regeneration zone by limiting the superficial velocity of the incoming fresh regeneration gas to the transport velocity, that is, the velocity above which large amounts of catalyst would be carried out of the dense bed to the disengaging space. Typical velocities are therefore less than about 3 feet per second with 1.5 to 2.5 being the usual range. Any catalyst entrained in the flue gas effluent passing from the dense bed is recovered and returned to the same dense bed by passing this effluent flue gas containing entrained catalyst through separation means such as cyclone separation devices located in the disengaging space and directing separated catalyst to the dense bed. Average residence time of the catalyst within the regeneration zone per pass through the zone is generally in the two to five minute range with 2 to 3 minutes being the more common, while the residence time of gas is generally within the range of 10 to 20 seconds. All of the regenerated catalyst is returned directly from the regeneration zone to a hydrocarbon-reaction zone without additional passes through any part of the regeneration zone.

Most regeneration processes are also operated to essentially preclude significant CO combustion by controlling the oxygen-containing gas stream introduced into the process to maintain a rather small predetermined temperature differential between a flue-gas-outlet or a disengaging-space temperature and a dense-bed temperature within the regeneration zone. Excess oxygen within the regeneration zone is thus minimized thereby severely limiting CO combustion to only that amount characterized by the small temperature differential. Since the conversion of CO to $CO_2$ is quite exothermic, this restricting of CO afterburning in most typical regeneration zones is done for the very practical reason of avoiding the damaging effects of excessively high temperatures in the upper disengaging space region of the regeneration apparatus where there is little catalyst present to act as a heat sink. This practice of admitting oxygen-containing gas into the process based upon a temperature differential, as exemplified by Pohlenz U.S. Pat. Nos. 3,161,583 and 3,206,391, produces a small amount of oxygen in the flue gas, generally in the range of about 0.1 to 1% oxygen, results in the flue gas containing from about 7 to about 14 vol. % CO and limits the temperatures achieved in the regeneration apparatus to a maximum of about 1275° F. Typically, the flue gas from such processes is directed to the atmosphere where permitted by local air quality standards or to a CO boiler where it is used as fuel to generate steam.

The combination of limiting the superficial velocities within the regeneration apparatus and controlling the amount of fresh regeneration gas to eliminate significant CO combustion, which combination is employed in most prior art FCC regeneration processes, essentially fixes the degree of catalyst regeneration, that is, the amount of residual coke on regenerated catalyst. Although it is widely known that the residual coke content on regenerated catalyst has a great influence on the conversion and product distribution obtained from the hydrocarbon reaction zone, residual coke level on regenerated catalyst produced by most present regeneration processes conducted in conventional regeneration apparatus is not an independent variable but is fixed for each regeneration apparatus design at a level typically from about 0.1 to about 0.4 wt. % carbon.

Catalyst regeneration processes described in the recent prior art have recognized the advantages of essentially completely converting CO to $CO_2$ and recovering at least a portion of the heat of combustion of CO both within the regeneration zone. Examples of such regeneration processes are Stine et al U.S. Pat. No. 3,844,973 and Horecky, Jr. et al U.S. Pat. No. 3,909,392. The advantages of such processes are now well known; such regeneration processes permit the reduction or elimination of feed preheat, the elimination of CO air pollution without the need for external CO boilers, and, when coupled with hydrocarbon-reaction zones of modern design, improved yields of more valuable products. In Stine et al U.S. Pat. No. 3,844,973 spent catalyst and fresh regeneration gas are passed into a first dense bed of a regeneration zone where coke is oxidized to produce regenerated catalyst and partially-spent regeneration gas which are passed in admixture through a transport riser wherein additional CO is oxidized to produce spent regeneration gas and heat of combustion is transferred to the regenerated catalyst. Hot regenerated catalyst and spent regeneration gas are separated and separated hot regenerated catalyst is passed to a second dense bed of catalyst from which it is returned to the hydrocarbon reaction zone. In the catalyst regeneration apparatus of Conner et al U.S. Pat. No. 3,893,812; Strother U.S. Pat. No. 3,898,050 and Pulak U.S. Pat. No. 3,953,175 a portion of the hot regenerated catalyst is returned from a second dense bed to a first dense bed via internal or external regenerated-catalyst recycle means to increase the temperature and hence the rate of coke oxidation in the first dense bed. The prior art has not, however, recognized the importance of properly mixing fresh regeneration gas, spent catalyst and the recycle hot regenerated catalyst so that the temperature in the first dense bed or coke oxidation zone is increased uniformly, fresh regeneration gas is used efficiently, and coke and CO oxidation proceed uniformly within the regeneration zone. Uniform coke oxidation is important in any regeneration zone to recover maximum activity from spent catalyst. Efficient use of fresh regeneration gas and uniform oxidization of coke and CO are particularly important in CO-burning regeneration processes where the refiner is usually concerned that the flue gas from the regeneration zone meet a specified air quality standard for CO. Poor mixing of spent catalyst and fresh regeneration gas results in uneven coke and CO oxidation which may require that the rate of fresh regeneration gas be increased beyond that required when there is good mixing in order to achieve a CO emission limitation. Besides reducing the coke-burning capacity of the regeneration zone an increased fresh regeneration gas rate may also increase the loading of the cyclone separation-devices in the regeneration zone thereby resulting in higher particulate emissions.

PRIOR ART STATEMENT

The closest reference of which I am aware is German O.S. No. 2,526,839. This reference discloses a regenerator which is in many aspects similar to mine, however it provides for mixing of hot regenerated catalyst and spent catalyst in a vertical riser-mixing zone placed beneath the coke combustion zone. A large portion of the combustion air is added to the lower portion of this vertical riser-mixer, and another portion of combustion air is added within the coke combustor itself. Such a design would provide for moderately effective mixing of fresh and regenerated catalyst, but would require somewhat greater space underneath the regenerator vessel than may be available in some instances, and also requires the addition of additional secondary air within the coke combustor.

In contrast to this reference, my design provides for vertical, downflow contact of hot regenerated and spent catalyst, without any fluidizing gas being present. This lack of fluidizing gas greatly simplifies the design, but will impair the particle-particle mixing which might otherwise be expected. Fairly efficient heat transfer between hot regenerated catalyst and relatively cooler spent catalyst will occur even though no fluidizing gas is present. A moving bed, or collapsing fluidized bed will have a very high internal heat transfer coefficient. The particles are all within a relatively narrow tube (e.g. 37 inches for a unit with a charge rate of 15,000 BPD), and no partition separates hot from cold catalyst. The catalyst, after passing through the vertical, downflow, heat exchange chamber, then contacts the entire amount of combustion gas. The catalyst, which had already been heat exchanged, achieves very good particle-particle mixing, and some further heat exchange, prior to entering the coke combustion chamber. All of this is accomplished in a configuration which is very compact, and does not require much vertical clearance beneath the coke combustion vessel. As a further bonus, my design does not require the addition of secondary air into the coke combustor.

In U.S. Pat. No. 3,893,812, there is disclosed the possibility of recycling hot regenerated catalyst directly to a spent catalyst inlet to a combustor. However, in this reference there is no means provided for mixing or heat exchange of hot regenerated catalyst and relatively cold spent catalyst prior to their introduction into the coke combustor, nor is there any way disclosed to permit some coke combustion to occur external to the combustor, i.e., 100% of the air added to the combustor is added at the base of the combustor, none of it is added with the hot regenerated or relatively cold spent catalyst.

SUMMARY OF THE INVENTION

Accordingly, the present invention provides in a regeneration process for oxidizing coke from spent catalyst, and oxidizing CO, resulting from the oxidation of coke, to $CO_2$ by (a) passing to a coke combustor spent catalyst contaminated with coke, regenerated catalyst from a hereinafter specified source, and fresh regeneration gas; (b) oxidizing coke in said combustor at oxidation conditions to produce regenerated catalyst, partially spent regeneration gas and CO; (c) passing regenerated catalyst and partially spent regeneration gas in admixture to a CO conversion zone and therein converting, at conversion conditions, CO to $CO_2$ to produce spent regeneration gas and hot regenerated catalyst; (d) separating hot regenerated catalyst from spent regeneration gas and (e) passing one portion of hot regenerated catalyst to said combustor and passing the remainder of said hot regenerated catalyst to a hydrocarbon reaction zone, WHEREIN THE IMPROVEMENT COMPRISES passing hot regenerated catalyst and spent catalyst into a vertical, downflow heat exchange zone external to said combustor, discharging the contents of said heat exchange zone into a horizontal mixing chamber conveying the entire amount of fresh regeneration gas added to said combustor, said mixing zone being external to said combustor, and discharging said mixing zone into said combustor.

Other embodiments and objects of the present invention encompass further details such as operating conditions of my process and the function and arrangement of various components of my apparatus all of which are hereinafter disclosed in the following discussion of each of these facets of the invention.

DESCRIPTION OF THE DRAWING

Having thus described the process and apparatus of my invention in brief general terms, reference is now made primarily to the apparatus aspect of my invention and specifically to the drawing depicting the side view of one embodiment of the apparatus. While the apparatus described will be in the terms of a preferred embodiment, it will be understood that it is not applicant's intention to limit the invention to that embodiment but rather to include all alternatives, modifications, and equivalents as may fairly be within the spirit and scope of the claims appended hereto. It will also be understood that the drawing is only shown in such detail as is necessary for an understanding of the invention and that various items such as minor valves, bleed and dispersion steam lines, expansion joints, instrumentation, and other control means have been omitted for the sake of simplicity.

The drawing shows the side view of the apparatus of my invention which basically comprises as the largest components spent-catalyst receiving chamber 1, regenerated-catalyst receiving chamber 2, transfer conduit 3, mixing conduit 4, heat transfer conduit 35, spent-catalyst conduit 5, and regenerated-catalyst recycle conduit 6. The basic components of the apparatus are first briefly defined as follows. The term "spent-catalyst receiving chamber" shall mean a chamber for containing a dense-phase fluidized bed of catalyst wherein the majority of coke is oxidized. The term "transfer conduit" as used herein shall mean a conduit in which CO conversion takes place in the presence of dilute-phase fluidized catalyst to produce flue gas and in which at least a portion of the heat of combustion is transferred to the catalyst. The term "regenerated-catalyst receiving chamber" shall mean a chamber for separating regenerated catalyst and flue gas and for containing a dense-phase bed of regenerated catalyst. The term "mixing conduit" means a conduit for mixing fresh regeneration gas, spent catalyst and a portion of hot regenerated catalyst. The term "spent-catalyst conduit" means a conduit through which spent catalyst passes. The term "heat transfer conduit" shall mean a conduit through which spent catalyst from a hydrocarbon-reaction zone and a portion of regenerated catalyst from the regenerated catalyst receiving chamber pass in admixture to the mixing conduit. The term "regenerated-catalyst recycle conduit" shall mean that component of the regeneration apparatus by which a portion of regenerated catalyst is recycled from a dense-phase bed of regenerated catalyst within the regenerated-catalyst receiving chamber to the spent-catalyst conduit.

Spent-catalyst receiving chamber 1, shown in the lower portion of the drawing, has a dense-phase fluidized bed of catalyst 7, having a level or interface 8, maintained within the chamber. Those skilled in the art of fluidization will of course understand that in actual operation such a sharp interface or demarcation between dense phase and dilute phase will not exist but rather the transition from dense phase to dilute phase will be characterized by varying catalyst densities. Spent-catalyst receiving chamber 1 has an inlet means 9 near the bottom of the chamber attached to outlet means 9 of mixing conduit 4. Inlet means 9 of spent-catalyst receiving chamber 1 and outlet means 9 of mixing conduit 4 are labeled the same since they are in communication with each other. A mixture of fresh regeneration gas, spent catalyst and a portion of hot regenerated catalyst is continuously introduced via inlet means 9 into bed 7 through distributing means 10 which allows the mixture to be more evenly distributed within chamber 1. Typically distributing means 10 will be a metal plate containing holes or slots or a pipe grid type containing large-diameter holes, both types of which are familiar to those skilled in the art. Oxidation of the carbonaceous deposits on the spent catalyst takes place in dense bed 7 to produce partially-spent regeneration gas and regenerated catalyst both of which pass out of chamber 1 in admixture through regenerated-catalyst/regeneration-gas outlet means 11, located at the top of chamber 1, and into inlet means 11 of transfer conduit 3 in which CO oxidation takes place to produce spent regeneration gas and where a portion of the heat of combustion of carbon monoxide is transferred to the catalyst being transported.

Transfer conduit 3 has inlet means 11 at its lower portion which is connected to regenerated-catalyst/regeneration-gas outlet means 11 of chamber 1. Inlet means 11 of conduit 3 and regenerated-catalyst/regeneration-gas outlet means 11 of chamber 1 are labeled the same since they are in communication with each other. Transfer conduit 3 extends vertically upward through the lower portion of regenerated-catalyst receiving chamber 2 and has an outlet means 12, which may comprise single or multiple openings, near its upper portion. Outlet means 12 will be connected to or in communication with a separation means whereby catalyst and regeneration gas passing out of conduit 3 can be separated. Separation means which can be employed in my apparatus shall include: a disengaging space by itself in which separation of regenerated catalyst and spent regeneration gas takes place by a sudden decrease in velocity of the mixture of catalyst and gas leaving outlet means 12; cyclone separation means arranged in parallel or series flow arrangements to achieve the desired degree of separation; or, combinations of a disengaging space and cyclone separation means. In the preferred embodiment indicated in the drawing the separation means is a combination of disengaging space 14 and cyclone separation means 16 which combination is effectively used to achieve the desired degree of separation. Another stage of cyclone separation, in addition to cyclone separation means 16, may optionally be used to achieve an even higher degree of separation. Regenerated catalyst and partially-spent regeneration gas pass in admixture from chamber 1 into volume 13 of transfer conduit 3 via inlet means 11 and flow upwardly through volume 13 and pass out of volume 13 and out of transfer conduit 3 through outlet means 12 into disengaging space 14. Preferably outlet means 12 will be positioned to discharge the mixture in a downward direction. Preferably conduit 3 will have a cap 15 located at its upper end and outlet means 12 will be positioned below the upper end so that a portion of volume 13 will be above outlet means 12 which portion can fill up with the catalyst and gas mixture thereby creating a cushion which will help prevent attrition in the upper end of conduit 3.

Regenerated-catalyst receiving chamber 2 contains a dilute-phase disengaging space 14 in which cyclone separation means 16 is located and contains a dense-phase bed of regenerated catalyst 17 having a level or interface 18 in the lower portion of the chamber. The mixture of regenerated catalyst and spent regeneration gas passes out of transfer conduit 3 through outlet means 12 into disengaging space 14 where some separation of catalyst and gas takes place because of the sudden decrease in the velocity of the mixture leaving outlet means 12. Some regenerated catalyst passes downward into dense bed 17 while spent regeneration gas and entrained regenerated catalyst pass from disengaging space 14 into cyclone separation means 16 through cyclone inlet means 19. Spent regeneration gas substantially free of catalyst passes out of cyclone separation means 16 through cyclone outlet means 21 while separated catalyst passes through dipleg 20 directed downward toward dense bed 17. Spent regeneration gas enters conduit 22 through conduit inlet means 21, passes through conduit 22, exits conduit 22 through conduit outlet means 23, passes into plenum chamber 24 through plenum-chamber inlet means 23 and passes out of plenum chamber 24 and out of chamber 1 through spent-regeneration-gas outlet means 25. Cyclone outlet means 21 and conduit inlet means 21 as well as conduit outlet means 23 and plenum-chamber inlet means 23 are labeled the same since items 21 and 23 each serve more than one function respectively. Hot regenerated catalyst moves downward through bed 17 and leaves bed 17 and chamber 2 through regenerated-catalyst outlet means 26 and 27. The primary purpose of maintaining dense bed 17 in chamber 2 is to provide the head necessary to ensure unidirectional flow of regenerated catalyst to the hydrocarbon reaction zone and to provide a seal to prevent the flow of hydrocarbon vapors from the hydrocarbon reaction zone into the regeneration zone. A first portion of regenerated catalyst leaves chamber 2 through outlet means 26, enters regenerated-catalyst recycle conduit 6 through conduit inlet means 26, passes through conduit 6 and exits conduit 6 through conduit outlet means 28. Control means 29 may be located on conduit 6 to control the rate of catalyst flow through conduit 6. Typically control means 29 will be a slide valve the design and operation of which is well known to the fluid catalytic cracking art. Regenerated-catalyst recycle means 6 will generally be designed to recycle an amount of regenerated catalyst equal to about 25 to about 200% but more preferably from about 50 to about 150% of the amount of spent catalyst entering spent-catalyst conduit 5 from a hydrocarbon reaction zone. The remainder of the regenerated catalyst leaves chamber 2 through outlet means 27, enters regenerated-catalyst conduit 30 through conduit inlet means 27 and passes through conduit 30 to the hydrocarbon-reaction zone (not shown) where catalyst again becomes contaminated with coke. Although not shown, a slide valve operated by a hydrocarbon-reaction-zone temperature or level controller will typically be located on conduit 30 to control the rate of catalyst flow to the hydrocarbon-reaction zone.

Spent catalyst from a hydrocarbon-reaction zone enters spent-catalyst conduit 5 through spent-catalyst inlet means 31. The rate of flow of spent catalyst from the hydrocarbon reaction zone will typically be controlled by control means 33, usually a slide valve, located on conduit 5. Downstream of control means 33 recycle regenerated catalyst will enter heat transfer conduit 35 through recycle-regenerated-catalyst inlet means 28. Spent catalyst and recycle regenerated catalyst will then pass in admixture through the remainder of heat transfer conduit 35, exit conduit 35 through outlet means 32, and enter mixing conduit 4 through mixing-conduit inlet means 32. It is essential to have contact of regenerated catalyst with spent catalyst to ensure proper heat exchange between the two catalyst streams.

Fresh regeneration gas enters mixing conduit 4 through gas inlet mean 34 and is mixed with the mixture of spent catalyst and recycle regenerated catalyst which enters mixing conduit 4 through catalyst inlet means 32. The mixture of fresh regeneration gas, spent catalyst and recycle regenerated catalyst leaves mixing conduit 4 through mixing-conduit outlet means 9 and passes into spent-catalyst receiving chamber 1.

Materials of construction for building my regeneration apparatus shall be materials which are able to withstand the abrasive conditions inherent in the fluidized-catalyst apparatus and which are able to withstand the high temperatures involved. Specifically, metals such as carbon steel and stainless steel which may or may not be lined with abrasion-resistant and/or refractory linings are contemplated. The mixing conduit should be designed and constructed to withstand constant sustained operation at temperatures up to about 1100° F. and operation at temperatures up to about 1200° F. or higher for short periods of time up to about 8 hours while the spent-catalyst receiving chamber should be so designed and constructed to withstand constant sustained operation at temperatures up to about 1400° F. and temperatures up to about 1450° F. or higher for short periods of time up to about 8 hours. The transfer conduit, regenerated-catalyst receiving chamber and regenerated-catalyst recycle conduit should be designed and constructed to be able to withstand constant sustained operation at temperatures up to about 1450° F. but also be capable of withstanding temperatures as high as 1500° F. to 1550° F. for shorter periods of time of up to about 8 hours. The entire apparatus should also be designed for normal operating pressures of from about atmospheric up to about 50 psig.

DESCRIPTION OF THE INVENTION

Having thus described the preferred embodiment of my regeneration apparatus in some detail, reference will now be directed primarily to the process aspect of my invention. At the outset the definitions of various terms will be useful in making clear the operation, objects and advantages of both the process and apparatus of my invention.

A fluid catalytic cracking process basically comprises contacting a hydrocarbon feed with cracking catalyst in a hydrocarbon-reaction zone to produce product components and spent catalyst and oxidizing coke from spent catalyst in a catalyst regeneration zone to restore catalyst activity for re-use in the hydrocarbon reaction zone. The term "spent catalyst" as used herein means catalyst withdrawn from a hydrocarbon reaction zone because of reduced activity caused by coke deposits. Spent catalyst can obtain anywhere from a few tenths up to about 5 wt. % carbon but typically in FCC operations spent catalyst will contain from about 0.5 to about 1.5 wt. % carbon. The term "regenerated catalyst" as used herein shall means catalyst from which coke has been removed by oxidation in a regeneration zone. Regenerated catalyst produced by the process of my invention will typically contain from about 0.01 to about 0.2 wt. % carbon and more specifically and preferably from about 0.01 to about 0.1 wt. % carbon. The term "coke" refers to material comprising primarily carbon and hydrogen which is deposited on catalyst in the hydrocarbon reaction zone and which is removed, to varying degrees, by oxidation in a regeneration zone. The majority of coke is carbon but hydrogen can comprise from about 5 to about 15 wt. % of the coke. In the refining industry coke-containing catalyst samples are commonly and routinely withdrawn from the hydrocarbon reaction zone and the regeneration zone and analyzed for their carbon content and results are reported as weight percent carbon. While this weight percent carbon result approximates the coke content, it is not, strictly speaking, equal to the coke content on a particular catalyst sample.

The term "regeneration gas" shall means, in a generic sense, any gas which is to contact catalyst or which has contacted catalyst within the regeneration zone. Specifically the term "fresh regeneration gas" shall include free-oxygen-containing gases such as air or oxygen-enriched or deficient air which pass into the regeneration zone to allow oxidation of coke from the spent catalyst. Depending upon the operating conditions employed by the regeneration process, particularly the amount of fresh regeneration gas passed into the process, coke can be oxidized to produce partially-spent regeneration gas or spent regeneration gas. The term "partially-spent regeneration gas" shall refer to regeneration gas which has contacted catalyst within the coke oxidation zone (hereinafter described) and which contains a reduced concentration of free oxygen as compared to fresh regeneration gas. The concentration of CO in partially-spent regeneration gas can vary over a wide range of from about 0.1 vol. % up to about 15 vol. % or more but typically partially-spent regeneration gas will contain from about 5 to about 14 vol. % each of CO and $CO_2$ along with various amounts of water, nitrogen and free oxygen. The term "spent regeneration gas" shall means regeneration gas which contains a reduced concentration of CO as compared to that of partially-spent regeneration gas. Preferably the spent regeneration gas will contain less than about 1000 ppm. of CO and more typically and preferably less than about 500 ppm. CO. It is therefore apparent that the term "essentially complete combustion of CO" as used herein shall mean that the CO concentration in the spent regeneration gas has been reduced to less than about 1000 ppm. and more preferably less than about 500 ppm. Free oxygen, carbon dioxide, nitrogen, and water will also be present in the spent regeneration gas. The free oxygen concentration of the spent regeneration gas will generally be from about 0.1 to 10 vol. % of the spent regeneration gas and more preferably will be from about 0.2 to about 5 vol. %.

The terms "dense-phase" and "dilute-phase" are commonly used terms in the art of fluidized solids and particularly in the art of fluid catalytic cracking to generally characterized catalyst densities in various parts of the process vessels or apparatus. While the demarcation density is somewhat ill-defined, as the term "dense-phase" is used herein it shall refer to regions within the catalyst regeneration apparatus where the catalyst density is greater than about 5 lb/ft$^3$ and as "dilute-phase" is used herein it refers to regions where the catalyst density is less than about 5 lb/ft$^3$. Usually the dense-phase density will be in the range of from about 5 to 35 lb/ft$^3$ or more and the dilute-phase density will be much less than 5 lb/ft$^3$ and in the range of from about 0.1 to about 3 lb/ft$^3$. Catalyst densities within the regeneration apparatus are commonly measured by measuring pressure or head differences across pressure taps installed in the apparatus and spaced known distances apart.

In the process of my invention coke and CO are oxidized in a regeneration zone but more specifically the operations of mixing of catalyst streams and fresh regeneration gas, oxidizing coke, oxidizing CO and separating catalyst and spent regeneration gas are primarily done in separate zones of the regeneration zone which are provided for such operations. Spent catalyst, recycle regenerated catalyst and fresh regeneration gas are mixed in a portion of the regeneration zone referred to as a "mixing zone", the mixture is passed to a portion of the regeneration zone referred to as a "coke oxidation zone" where coke is oxidized to produce partially-spent regeneration gas and regenerated catalyst, both are passed in admixture to another portion of the regeneration zone referred to as a "CO-conversion zone" where additional CO is oxidized in the presence of regenerated catalyst and where at least a portion of the heat of CO combustion is transferred to the regenerated catalyst, and the mixture of regeneration gas and hot regenerated catalyst is then separated by cyclone separation devices located in a fourth portion of the regeneration zone referred to as a "separation zone".

With these terms in mind a brief consideration of the design and operation of typical prior art regeneration processes will make the operation and advantages of my process more apparent. In the prior art processes spent catalyst and fresh regeneration gas are introduced separately into the regeneration zone. Fresh regeneration gas by itself typically enters the regeneration zone through a pipe grid arrangement which sparges the gas through catalyst maintained in a dense-phase fluidized bed in the zone while spent catalyst by itself typically enters the regeneration zone through a single tangential inlet means which produces a swirling stream of spent catalyst around the inside of the regeneration zone. Such devices do not, however, produce optimum mixing of gas and catalyst and therefore do not ensure uniform oxidation of coke and CO. Recovery of less than maximum activity for regenerated catalyst and inefficient use of fresh regeneration gas results. Catalyst introduced into the regeneration zone is typically maintained in one or more dense-phase beds for total average catalyst residence times of two minutes or more by limiting the superficial velocity of the incoming fresh regeneration gas. The superficial velocity is limited to the transport velocity, that is, the velocity above which large amounts of catalyst would be carried out of the dense bed to the cyclones. Typical velocities are therefore less than about 3 feet per second with about 1.5 to about ;b 2.5 being the usual range. It is this limit on superficial velocity which produces the rather large catalyst inventories found in many prior art regeneration zones. The determination of the inventory in a typical prior art regeneration zone is based upon the feed rate to the FCC process (or more specifically upon the coke yield anticipated from that feed rate) and the superficial velocity in the regeneration zone. This coke yield anticipated from a desired feed rate determines the rate of the fresh regeneration gas to the regeneration zone and this gas rate at a limiting superficial velocity then determines the cross-sectional area of the regeneration zone. With a known catalyst density and height of the dense bed the inventory of the regeneration zone, and for practical purposes for the FCC process, is fixed. Catalyst residence times which result are generally from about 2 to 5 minutes with about 2 to 3 being the general range. Since the amount of catalyst which must be added to an FCC process on a daily basis to make up losses and maintain catalyst activity tends to be a percentage of the total catalyst inventory (typically from about 1 to about 3% of the total inventory depending on such factors as feedstock quality, catalyst attrition resistance, and cyclone separator efficiencies) make up rates for FCC units using most of the prior art regeneration processes tend to be rather large and the cost of such make up catalyst, particularly of the more expensive zeolite-containing catalysts, contributes significantly to the daily operating expense of the FCC process. In many typical regeneration processes now used in fluid catalytic cracking CO resulting from the oxidation of coke is not essentially completely oxidized to $CO_2$. More specifically the amount of fresh regeneration gas admitted to most prior art regeneration processes is typically controlled by a predetermined temperature differential between the gas oulet section of the regeneration zone and either a dense bed temperature or a dilute phase temperature within the regeneration zone. Such control scheme minimizes excess oxygen leaving the unit and essentially precludes significant CO combustion within any portion of the regeneration zone. Since there is no significant combustion of CO, temperatures within the regeneration zone will generally not be higher than about 1275° F. with the usual range being from about 1150° F. to about 1250° F. Should it be necessary or desirable to increase a regeneration zone temperature, including the regenerated catalyst temperature, beyond this range, torch oil will have to be added to and burned within the regeneration zone or the amount of coke on spent catalyst will have to be increased such as by increasing the rate of slurry oil recycled to the hydrocarbon reaction zone. When such a control scheme for fresh regeneration gas is used the amount of residual coke left on regenerated catalyst is largely a function of regeneration apparatus design, that is, how well gas and solids are mixed, the number of stages used, the residence time, and the resulting temperature. Typically regenerated catalyst will contain from about 0.1 to about 0.4 wt. % carbon. Partially spent regeneration gas is separated from entrained regenerated catalyst by cyclone separation means located within the regeneration zone and separated gas containing CO is passed from the regeneration zone either directly to the atmosphere or to a carbon monoxide boiler where the chemical heat of carbon monoxide is recovered externally to the regeneration zone by combustion as a fuel for the production of steam. Separated regenerated catalyst is returned to the bottom portion of the regeneration zone, leaves the regeneration zone and contacts the feedstock in the hydrocarbon reaction zone.

Thus most prior art regeneration processes have one or more of these disadvantages: no provision may be made for the essentially complete conversion of CO to $CO_2$ within the regeneration zone and a CO disposal problem thus arises; when essentiallycomplete CO conversion is precluded, the coke oxidation temperature cannot be increased without such methods as burning external torch oil within the zone or increasing the amount of coke on spent catalyst; coke oxidation may be non-uniform resulting in inefficient use of fresh regeneration gas and producing regenerated catalyst containing significant amounts of residual coke and having less than maximum activity; and, catalyst inventories and make up rates may be rather large.

With the process of my invention coke from spent catalyst can be efficiently and uniformly oxidized to produce regenerated catalyst having very low residual coke levels and CO produced can be uniformly and essentially completely converted to $CO_2$ with at least a portion of the heat of combustion being recovered and used within the process. Efficient uniform oxidation of coke and CO are achieved by the combination of mixing recycle regenerated catalyst, spent catalyst and fresh regeneration gas in a mixing zone external to the coke oxidation zone, passing the mixture into a coke oxidation zone at a superficial velocities higher than the transport velocity, oxidizing coke in a coke oxidation zone and converting CO to $CO_2$ in the presence of regenerated catalyst in a CO conversion zone. More specifically, a portion of regenerated catalyst at a hereinafter described second temperature, spent catalyst and fresh regeneration gas are passed to a mixing zone where they are mixed at mixing conditions to form catalyst-gas mixture. Mixing conditions will preferably include superficial fresh-regeneration-gas velocity of from about 25 to about 75 feet per second and a temperature within a range of from about 500° F. to about 1000° F. and a catalyst residence time of from about 0.5 to about 10 seconds. The catalyst and fresh regeneration gas mixture is then passed into a coke oxidation zone containing a dense-phase bed of fluidized catalyst and coke and CO are oxidized at oxidation conditions including a first temperature to produce regenerated catalyst and partially-spent regeneration gas. Preferred oxidation conditions include a catalyst residence time of less than about 2 minutes, a regeneration gas residence time of less than about 10 seconds, a first temperature from about 1200° F. to about 1400° F., a superficial regeneration gas velocity of from about 3 to about 10 feet per second and a pressure from about atmospheric to about 50 psig. Essentially all of the coke oxidation takes place within the coke oxidizing zone but because of the short regeneration-gas residence time conversion of CO to $CO_2$ within this zone is not complete. Partially-spent regeneration gas and regenerated catalyst are transported from the coke oxidation zone into a CO conversion zone where at CO conversion conditions additional CO oxidation takes place and where at least a portion of the heat of combustion of the CO is transferred to the regenerated catalyst to produce regenerated catalyst at a second temperature higher than the first temperature. Preferred CO conversion conditions within the CO conversion zone include a temperature from about 1250° F. to about 1450° F., a pressure from about atmospheric to about 50 psig., and a superficial gas velocity of from about 10 to about 25 feet per second. No other combustible fluid other than CO need be oxidized within the CO conversion zone because a sufficient portion of the heat of combustion of CO will be transferred to the catalyst within the zone to produce regenerated catalyst at a second temperature within a preferred range of from about 1250° F. to about 1325° F. Regenerated catalyst temperatures higher than about 1325° F. tend to cause excessive amounts of thermal cracking when mixed with the feedstock in the hydrocarbon reaction zone and are therefore to be avoided. The addition of combustible fluids such as fuel gas, feedstock, or torch oil to and the combustion of such fluids within the CO conversion zone is therefore not necessary and indeed may be harmful to the product yields obtained from the FCC process. Regenerated catalyst and spent regeneration gas are then separated at separating conditions by cyclone separation devices located within a separation zone and spent regeneration gas is passed out of the separation zone and the regeneration zone. A portion of regenerated catalyst which has been heated to a second temperature higher than a first temperature within the coke oxidation zone is mixed with spent catalyst and the mixture is passed into the mixing zone where it is mixed with fresh regeneration gas. The purpose of recycling a portion of regenerated catalyst from the separation zone to the mixing zone and then to the coke oxidation zone is to increase the density and temperature within the coke oxidation zone thereby increasing the rate and extent of coke and CO oxidation. The remainder of the regenerated catalyst leaves the separation zone and the regeneration zone and is passed to the hydrocarbon regeneration zone.

Thus the process of my invention overcomes disadvantages found in prior art regeneration processes. The process of my invention makes it possible to produce regenerated catalyst samples of which have uniform low residual coke concentrations and therefore higher activity, to eliminate the problem of CO pollution without requiring a CO boiler and to recover within the process at least a portion of the heat of CO combustion for advantageous uses within the regeneration process and the FCC process. The mixing of a portion of hot regenerated catalyst, spent catalyst and fresh regeneration gas in a mixing zone external to the coke oxidation zone and the passing of that mixture to the coke oxidation zone increases the rate, extent and uniformity of coke and CO oxidation thereby making a smaller regeneration zone possible. The return to the hydrocarbon reaction zone of regenerated catalyst at a temperature higher than that usually obtained in a non-CO-burning regeneration process allows possible reduction in hydrocarbon feed preheat requirements. Dramatic catalyst inventory reductions are possible by my process since the superficial velocity of the fresh regeneration gas into the regeneration zone is not limited to the transport velocity. Superficial velocities in the coke oxidation zone will be in the range of about 3 to 10 feet per second so that catalyst can be carried from the coke oxidation zone into the CO conversion zone. With superficial velocities now 2 to 3 times and transport velocity, catalyst inventories using my process will be about 40 to 60 percent of many typical regeneration processes. As an example, a moderately sized FCC process of the type presently in industry use will contain about 150 tons of catalyst. By using my regeneration process in an FCC process of the same size, a refiner could save the initial investment represented by at least 75 tons of catalyst. Catalyst make up rates required to make up losses and maintain activity will also be reduced with my process since such rates tend to be a percentage of the total catalyst inventory. Because of the combination of higher temperature which result from the recycle of hot regenerated catalyst, better gas-solid contact due to improved mixing, higher oxygen partial pressures, and increased density of the dense-phase catalyst bed both the rate and extent or degree of completion of coke combustion in my process will be increased thus permitting a reduction of once-through catalyst residence times from the present 2 to 5 minutes found in many typical regeneration processes to less than about 2 minutes in the coke oxidation zone or my regeneration process. Besides permitting smaller-sized apparatus another result of the combination of the flow scheme and operating conditions employed in my process is that it may allow the steam stripping of flue gas components from the regenerated catalyst. In spite of the fact that flue gas components are entrained by regenerated catalyst passing into the hydrocarbon reaction zone and hence become part of a product stream, steam stripping of regenerated catalyst has generally not been practiced because of the longer catalyst residence times in conventional regeneration zone and because the entire catalyst inventory is generally maintained in a single dense bed within the regeneration zone. Exposure of this quantity of catalyst to steam for this longer period of time would increase the catalyst deactivation rate. My process, however, may now permit steam stripping.

I claim as my invention:

1. In a regeneration process for oxidizing coke from spent catalyst, and oxidizing CO, resulting from the oxidation of coke, to $CO_2$ by
   (a) passing to a coke combustor spent catalyst contaminated with coke, regenerated catalyst from a hereinafter specified source, and fresh regeneration gas:
   (b) oxidizing coke in said combustor at oxidation conditions to produce regenerated catalyst, partially spent regeneration gas and CO;
   (c) passing regenerated catalyst and partially spent regeneration gas in admixture to a CO conversion zone and therein converting, at conversion conditions, CO to $CO_2$ to produce spent regeneration gas and hot regenerated catalyst;
   (d) separating hot regenerated catalyst from spent regeneration gas and
   (e) passing one portion of hot regenerated catalyst to said combustor and passing the remainder of said hot regenerated catalyst to a hydrocarbon reaction zone, WHEREIN THE IMPROVEMENT COMPRISES passing hot regenerated catalyst and spent catalyst into a vertical, downflow heat exchange zone external to said combustor in the absence of fluidizing gas, discharging the contents of said heat exchange zone into a horizontal mixing zone, adding fresh regeneration gas to said mixing zone in an amount such that the addition of secondary air to the combustor is not required, conveying the entire amount of fresh regeneration gas so added to said mixing zone to said combustor, said mixing zone being external to said combustor, and discharging the contents of said mixing zone into said combustor.

2. Improved process of claim 1 wherein the conditions in the vertical, downflow heat exchange zone include a catalyst residence time of 1 to 5 seconds, and wherein the ratio of the length of said contacting zone to the diameter of said contacting zone is about 2.5:1 to 10:1.

3. Improved process of claim 1 wherein the superficial fresh-regeneration-gas velocity within said mixing zone is 25 to 75 ft/sec and the catalyst residence time in said mixing zone is 0.1 to 1.0 seconds.

4. Improved process of claim 1 wherein the ratio of hot regenerated catalyst to spent catalyst in said heat exchange zone is 0.25 to 1 to 2 to 1.

* * * * *